United States Patent
Kuo et al.

(10) Patent No.: US 11,842,033 B1
(45) Date of Patent: Dec. 12, 2023

(54) METHOD FOR SHARING CONSOLE VARIABLE SETTING OF APPLICATION AND SYSTEM WITH PLURALITY OF ELECTRONIC DEVICES

(71) Applicant: Getac Technology Corporation, New Taipei (TW)

(72) Inventors: Chun-Yu Kuo, Taipei (TW); Da-Ke Liu, Taipei (TW); Shih-Hui Cheng, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/170,056

(22) Filed: Feb. 16, 2023

Related U.S. Application Data

(60) Provisional application No. 63/402,029, filed on Aug. 29, 2022.

(51) Int. Cl.
  *G06F 3/0482* (2013.01)
  *G06F 3/0485* (2022.01)

(52) U.S. Cl.
  CPC .......... *G06F 3/0482* (2013.01); *G06F 3/0485* (2013.01)

(58) Field of Classification Search
  CPC .............................. G06F 3/0482; G06F 3/0485
  See application file for complete search history.

(56) References Cited

U.S. PATENT DOCUMENTS

| | | | |
|---|---|---|---|
| 9,459,827 B2 | 10/2016 | Asada et al. | |
| 2001/0030662 A1* | 10/2001 | Ohkawa | G06F 3/0481 715/764 |
| 2006/0015535 A1* | 1/2006 | Buchsbaum | G06F 16/116 |
| 2009/0195663 A1* | 8/2009 | Perotti | H04N 1/00342 348/207.99 |
| 2017/0317879 A1 | 11/2017 | Wei et al. | |
| 2021/0256768 A1* | 8/2021 | Zhao | G06F 9/547 |

(Continued)

FOREIGN PATENT DOCUMENTS

| | | |
|---|---|---|
| CN | 110287162 A | 9/2019 |
| CN | 113365153 A | 9/2021 |
| CN | 114139169 A | 3/2022 |

(Continued)

OTHER PUBLICATIONS

Lee Lienhard: "Introduction To Ezconfig"; Honeywell; copyright 2013; pp. 1-43. (tutorial: EZConfig for Scanners "How to Use" guide (Tutorial) (honeywellaidc.com)).

*Primary Examiner* — Seth A Silverman
(74) *Attorney, Agent, or Firm* — McClure, Qualey & Rodack, LLP

(57) ABSTRACT

A method for sharing a console variable setting of an application is applied to a plurality of electronic devices. The sharing method includes: generating, by a first electronic device, a meta file, where the meta file has setting parameters for a plurality of first setting options of a first application of the first electronic device; transforming, by the first electronic device, the meta file into a set coding image; and displaying, by the first electronic device, a display frame with the set coding image. Therefore, a second electronic device can automatically adjust setting parameters for a plurality of second setting options of a second application into setting parameters the same as those of the first application by capturing the set coding image in the display frame.

11 Claims, 8 Drawing Sheets

(56) References Cited

U.S. PATENT DOCUMENTS

2022/0052870 A1    2/2022   Guo et al.
2022/0124076 A1*   4/2022   Chaubey ............. H04L 63/0428

FOREIGN PATENT DOCUMENTS

| CN | 114554131 A | 5/2022 |
| EP | 2894931 A1  | 7/2015 |
| TW | I660606 B   | 5/2019 |

* cited by examiner

METHOD FOR SHARING CONSOLE VARIABLE SETTING OF APPLICATION AND SYSTEM WITH PLURALITY OF ELECTRONIC DEVICES

CROSS-REFERENCE TO RELATED APPLICATION

This application claims the benefit of U.S. provisional application Ser. No. 63/402,029, filed on Aug. 29, 2022. The entirety of the above-mentioned patent application is hereby incorporated by reference herein and made a part of the specification.

BACKGROUND OF THE INVENTION

The present invention relates to a parameter setting method of a plurality of electronic devices, and in particular, to a method for sharing a console variable setting of an application and a system with a plurality of electronic devices.

With the diversification of functions of electronic devices, many electronic devices will be equipped with control setting interfaces to adjust the detailed functions of the electronic devices. The electronic devices can adapt to different operating environments according to different functional combinations, for example, a point of sale information system (POS) machine of warehouse managers. For the warehousing of the same factory, each POS machine should be equipped with the same operating environment. The warehouse staff can use the POS machine without pressure even if a different POS machine from the previous one is obtained. Since related console variable settings of each electronic device need to be set one by one, the setting process takes a lot of labor and time.

SUMMARY OF THE INVENTION

In view of this, the present invention provides a method for sharing a console variable setting of an application and a system with a plurality of electronic devices, so as to quickly set the console variable settings of the same application of the plurality of electronic devices.

In some embodiments, the method for sharing a console variable setting of an application includes: generating, by a first electronic device, a meta file, where the meta file includes setting parameters for a plurality of first setting options of a first application of the first electronic device; and transforming, by the first electronic device, the meta file into a set coding image, and displaying a display frame with the set coding image.

In some embodiments, the sharing method further includes: capturing, by a second electronic device, the set coding image on the display frame; transforming, by the second electronic device, the captured set coding image into a meta file; and adjusting the setting parameters, by the second electronic device, settings for a plurality of second setting options of a second application according to the meta file.

In some embodiments, the first setting options include a checkbox, a checklist, a group of options (radio or option), a dropdown list, a toggle switch, a label, or a text field, and types and an order of the second setting options are the same as those of the first setting options.

In some embodiments, the meta file further includes program information of the first application.

In some embodiments, the adjusting step includes: selecting and enabling, by the second electronic device, the second application the same as the first application according to the program information, and setting, by the second electronic device, the second setting options of the second application according to the setting parameters in the meta file.

In some embodiments, locations, labels, and a setting order of the first setting options of the first application are recorded in the meta file.

In some embodiments, a method for sharing a console variable setting of an application includes: capturing a set coding image; transforming the captured set coding image into a meta file, where the meta file includes setting parameters for a plurality of first setting options in a first application; and setting a plurality of second setting options of a second application the same as the first application according to the meta file.

In some embodiments, a system with a plurality of electronic devices includes a first electronic device and a second electronic device. The first electronic device includes a first processing unit, a first storage unit, and a first display unit. The first processing unit is connected to the first storage unit and the first display unit, and the first storage unit is configured to store the first application. The first processing unit executes the first application. During the execution of the first application, the first processing unit generates a meta file according to a plurality of first setting options of the first application, transform the meta file into a set coding image, and display a display frame with the set coding image on the first display unit. The second electronic device includes a second processing unit, a second storage unit, and a photographing unit. The second processing unit is connected to the second storage unit and the photographing unit, and the second storage unit is configured to store a second application. The second processing unit is configured to capture the display frame on the first display unit through the photographing unit to obtain the set coding image, decode the set coding image to obtain the meta file, and then execute the second application and set a plurality of second setting options of the second application according to the meta file.

In some embodiments, the meta file further includes program information of the first application.

In some embodiments, the second electronic device is configured to select and execute the second application the same as the first application according to the program information, and then set the second setting options according to the setting parameters in the meta file.

In some embodiments, the first setting options include a checkbox, a checklist, a group of options, a dropdown list, a toggle switch, a label, or a text field, and types and an order of the second setting options are the same as those of the first setting options.

In some embodiments, the first processing unit records locations, labels, and a setting order of the first setting options of the first application to the meta file.

Based on the above, according to the method for sharing a console variable setting of an application and the system with a plurality of electronic devices provided in any of the embodiments, the setting content of the setting option of the application can be conveniently acquired, and the same applications on other electronic devices are quickly set to the same setting parameters.

DETAILED DESCRIPTION OF THE INVENTION

Figure 1:
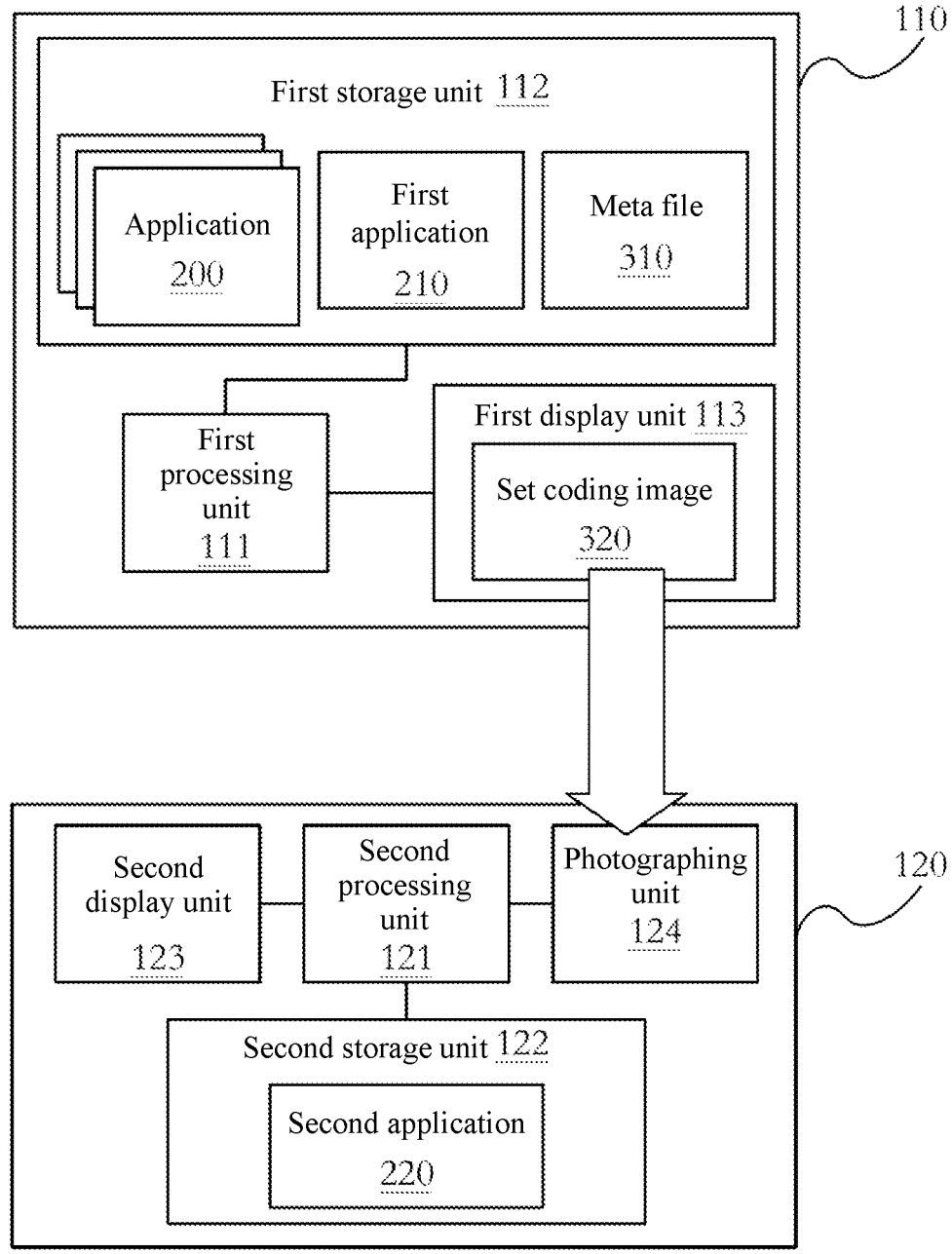
FIG. 1 is a functional schematic diagram of a system with a plurality of electronic devices according to an embodiment.

Referring to FIG. 1, a method for sharing a console variable setting of an application is applicable to a system with a plurality of electronic devices (referred to as a processing system 100 below). Two electronic devices are used as an example, which are respectively referred to as a first electronic device 110 and a second electronic device 120. The first electronic device 110 and the second electronic device 120 may be, but are not limited to, personal computers, notebook computers, tablet computers, mobile phones, bar-code scanner, or the like.

Figure 2:
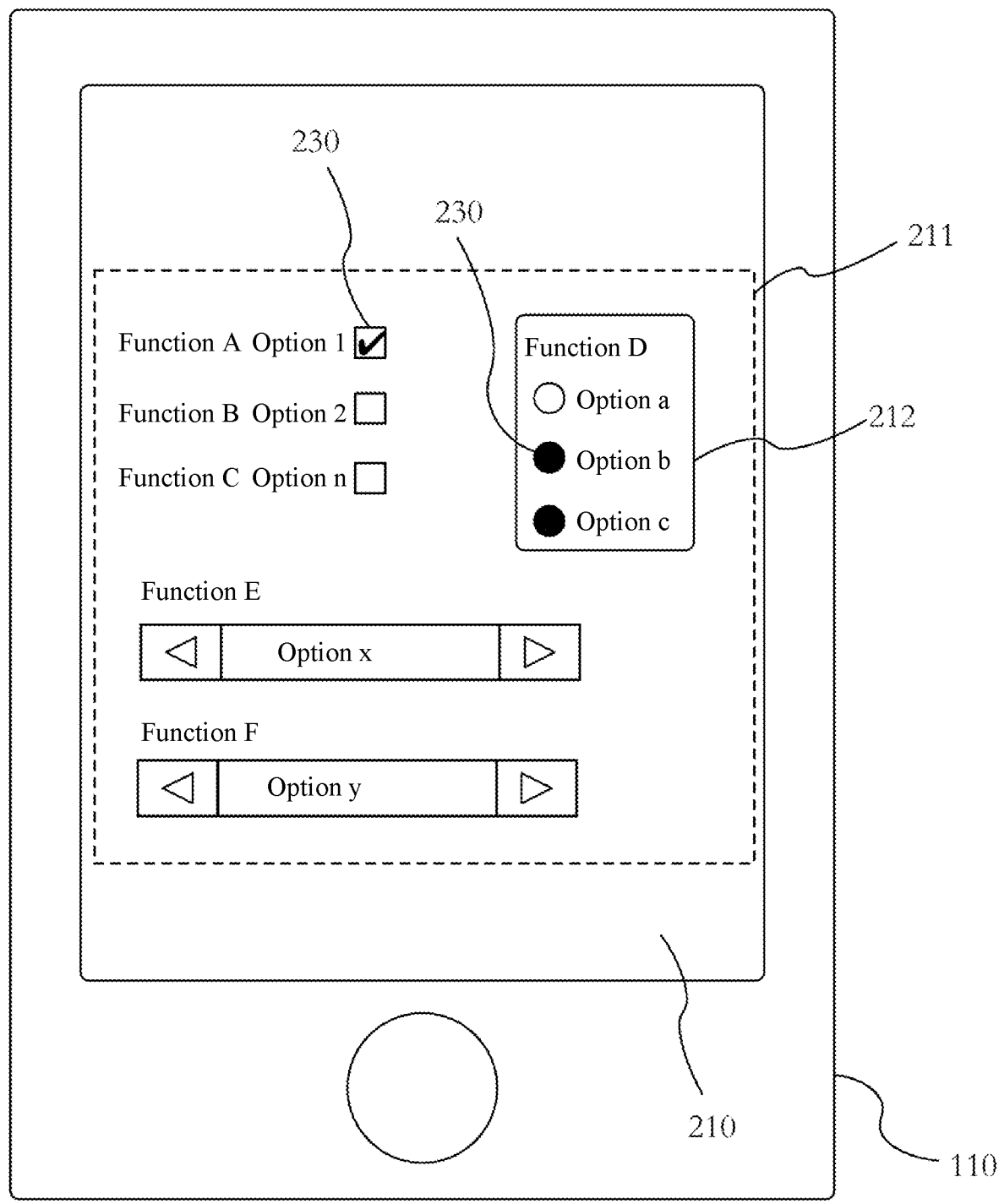
FIG. 2 is a schematic diagram of a first setting panel and setting parameters according to an embodiment.

The first electronic device 110 includes a first processing unit 111, a first storage unit 112, and a first display unit 113. The first processing unit 111 is connected to the first storage unit 112 and the first display unit 113. The first storage unit 112 stores a plurality of applications 200. A user may select one of the plurality of applications 200 through a user interface (not shown) of the first electronic device 110. In order to further distinguish between the selected applications 200, the selected application 200 in the first electronic device 110 is referred to as a first application 210. The first processing unit 111 executes the first application 210. The first application 210 has a setting panel (referred to as a first setting panel 211 below), as shown in FIG. 2. The first display unit 113 displays the first setting panel 211. The first setting panel 211 has a plurality of sets of setting options (referred to as first setting options 212 below), as shown in FIG. 2.

A type of the first setting options 212 may be a checkbox, a checklist, a group of options (radio or option), a dropdown list, a toggle switch, a label, or a text field. Each of the first setting options 212 has a setting parameter (that is, a set value indicating whether to select and/or a content to be selected) 230. For example, the setting parameter 230 of the checkbox is a Boolean variable, that is, a "true value" or a "false value". The setting parameter 230 in the group of options is a group composed of a plurality of sets of Boolean variables. The setting parameters 230 of the dropdown list and the text field are text strings.

Referring to FIG. 1 to FIG. 4, the first processing unit 111 reads set values (that is, the setting parameters 230) of the first setting options 212 through the first application 210 and generates a meta file 310 according to the setting parameters 230 of the first setting options 212 (step S410). In other words, the meta file 310 includes a plurality of first setting options 212 in the first application 210 of the first electronic device 110 and the setting parameters 230.

Figure 4:
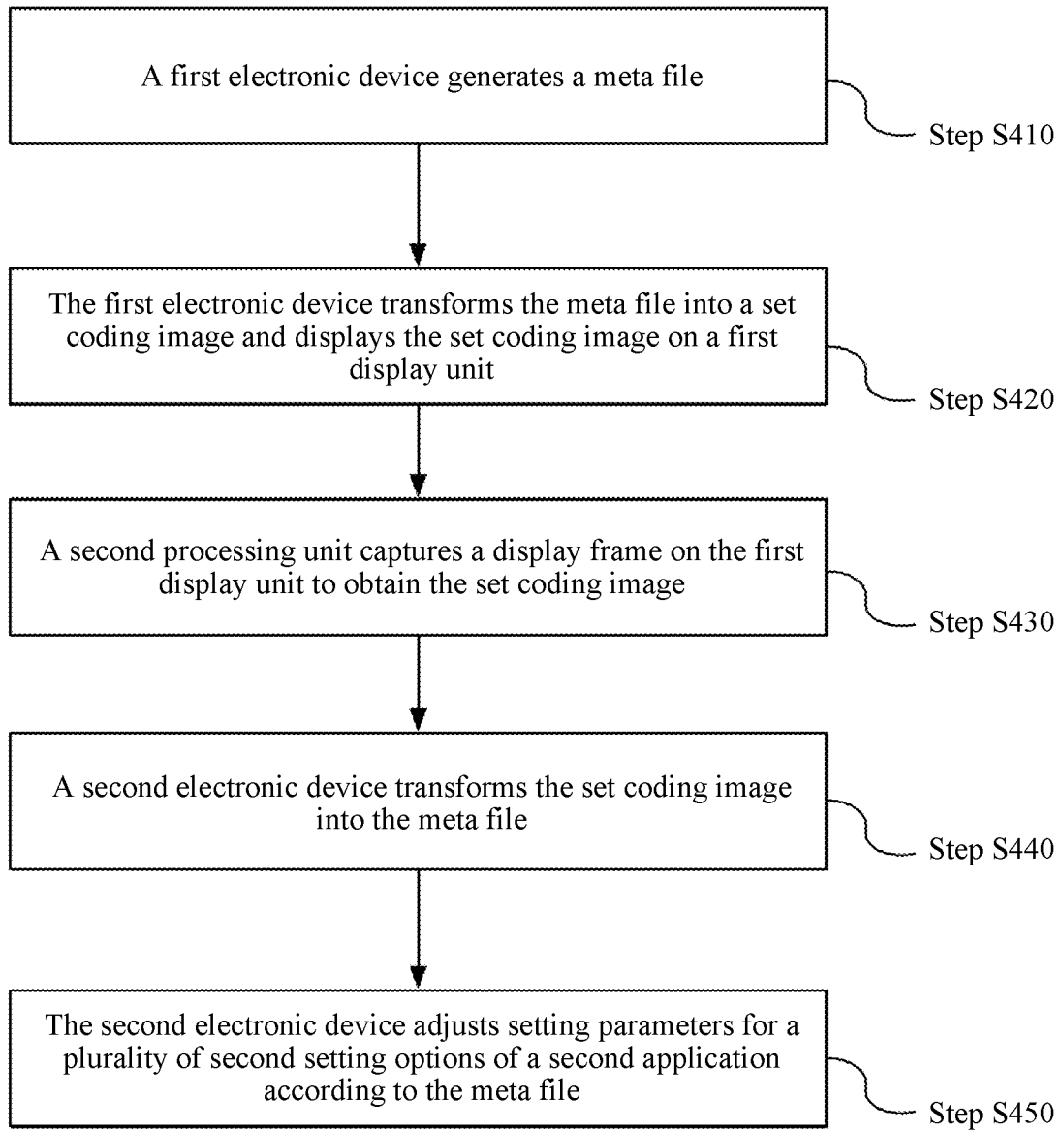
FIG. 4 is a schematic flowchart of a method for sharing a console variable setting of an application according to an embodiment.

Then the first processing unit 111 transforms the meta file 310 into a set coding image 320 through the first application 210, and displays a display frame with the set coding image 320 on the first display unit 113 (step S420), as shown in FIG. 4.

Figure 3:
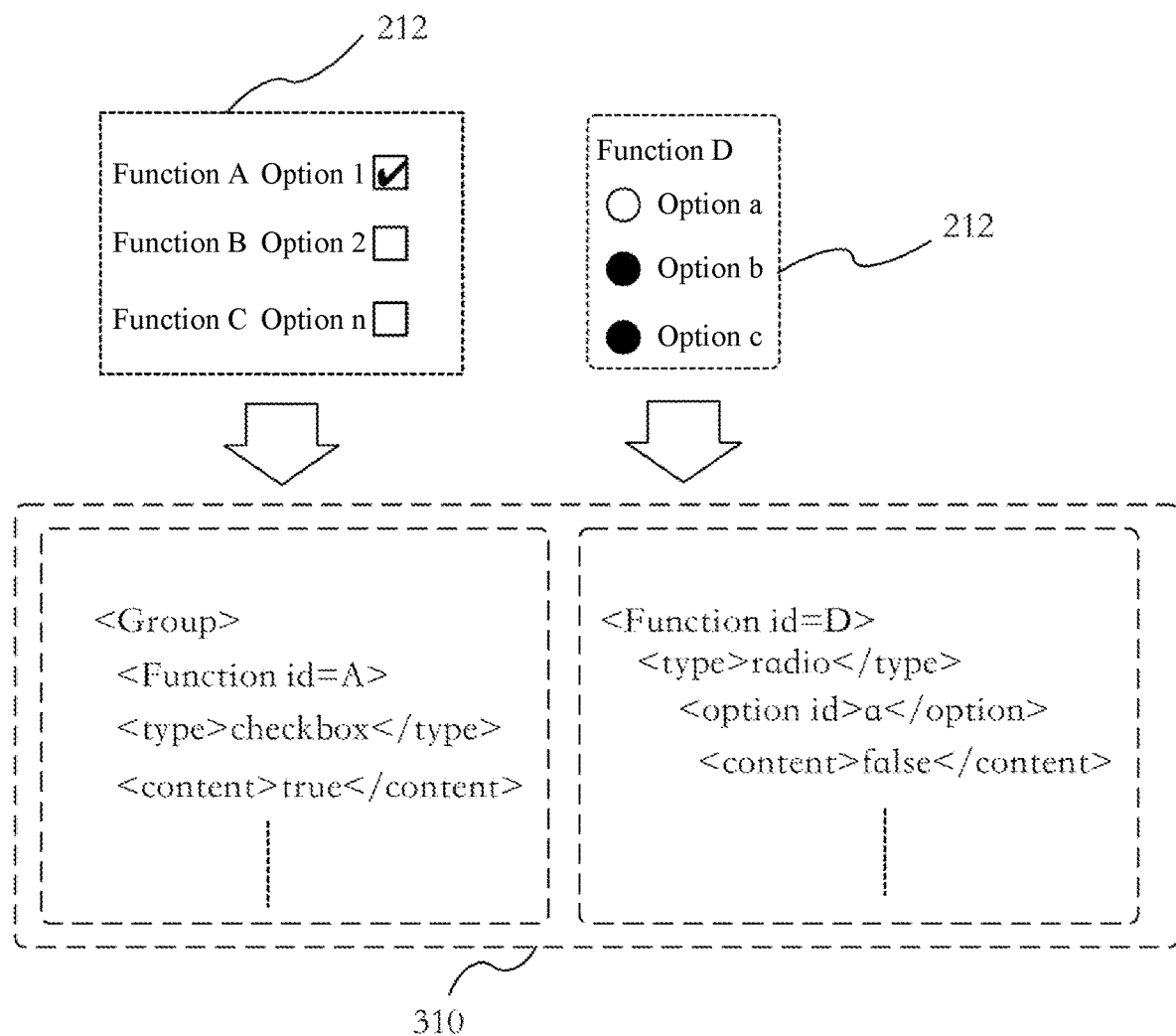
FIG. 3 is a schematic diagram showing transformation between setting parameters and a meta file according to an embodiment.

In some embodiments, the meta file 310 may be, but is not limited to, an extensible markup language (XML) or a lightweight markup language (Markdown). For example, the first processing unit 111 generates the corresponding tree text content in the XML file according to each group or option (that is, the setting parameter 230) in the first setting option 212, and then encodes the XML file into the set coding image 320. The content of the XML file in FIG. 3 is the setting parameter 230 corresponding to the first setting option 212 in FIG. 2. The first setting option 212 and the contents of the XML file shown in FIG. 3 are only examples, and are not limited thereto.

In some embodiments, the first processing unit 111 may store the generated meta file 310 in the first storage unit 112.

In some embodiments, the first processing unit 111 may respectively transform different kinds of first setting options 212 to a plurality of set coding images 320. In some other embodiments, the first processing unit 111 may also transform all of the first setting options 212 into a single set coding image 320.

In some embodiments, the set coding image 320 may be a 1D barcode (for example, Code 39, Code 2 of 5 Interleaved, an EAN-13 barcode, an EAN-8 barcode, or Code 128), a 2D barcode (for example, a QR code, PDF417, a composite barcode, or Data Matrix), or a combination thereof.

The second electronic device 120 includes a second processing unit 121, a second storage unit 122, a second display unit 123, and a photographing unit 124. The second processing unit 121 is connected to the second storage unit 122, the second display unit 123, and the photographing unit 124. The second storage unit 122 stores at least one application.

When the same application is to be set, the second processing unit 121 drives the photographing unit 124, and captures the display frame with the set coding image 320 on the first display unit 113 through the photographing unit 124 to obtain the set coding image 320 (step S430). Since the applications executed by the first electronic device 110 and the second electronic device 120 are the same, in order to distinguish between the two applications, the application executed by the second electronic device 120 is referred to as a second application 220, and the first application 210 and the second application 220 are the same application.

After obtaining the set coding image 320 (step S430), the second processing unit 121 transforms the set coding image 320 into the meta file 310 (step S440), and adjusts setting parameters 230 of a plurality of second setting options 222 of the second application 220 according to the meta file 310 (step S450).

Figure 8:
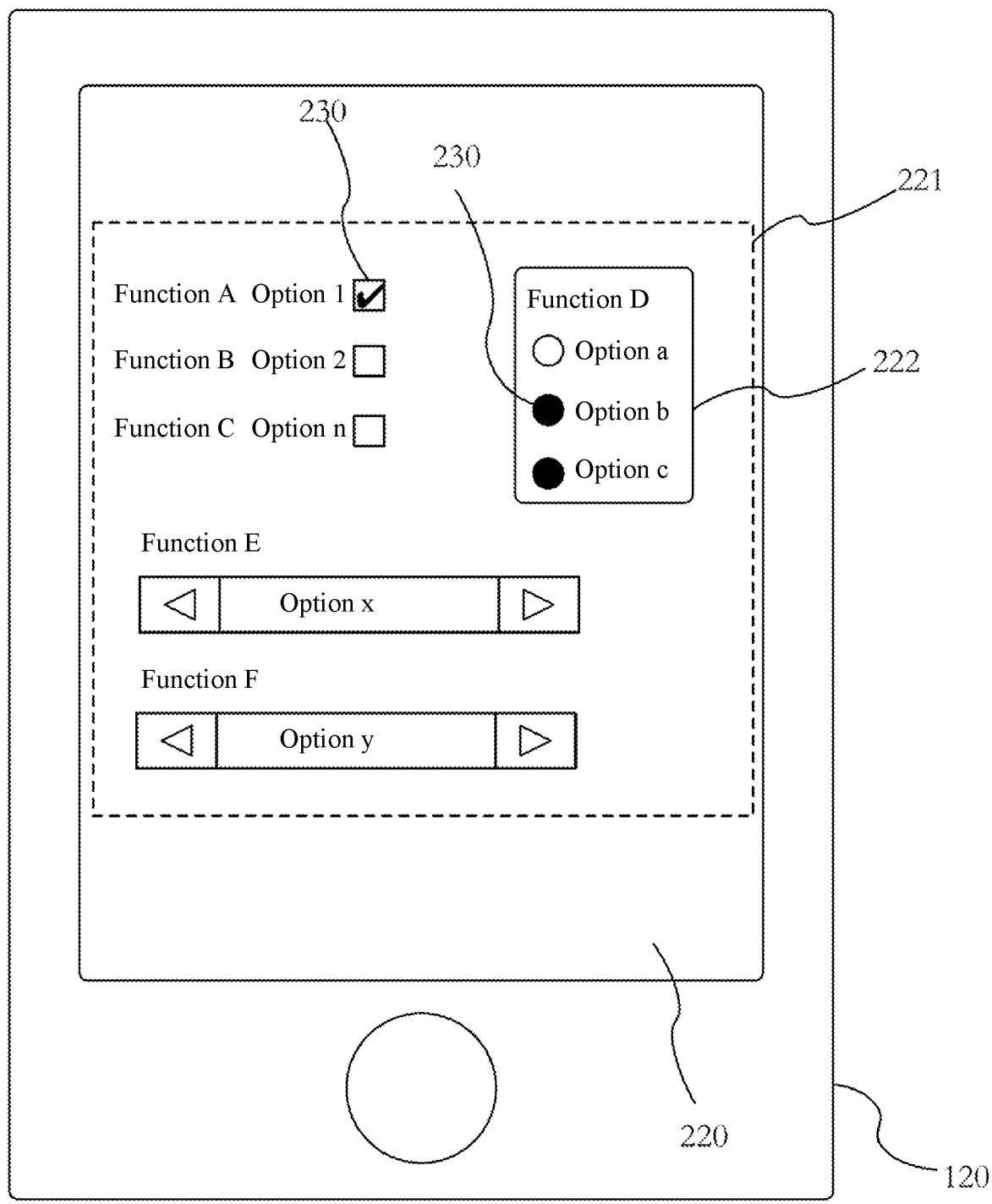
FIG. 8 is a schematic diagram of a second setting panel and setting parameters according to an embodiment.

In other words, the second application 220 has a second setting panel 221. Since the first application 210 and the second application 220 are the same application, a layout of the first setting panel 211 is the same as a layout of the second setting panel 221. The second setting panel 221 also has a plurality of setting options. The setting options of the second setting panel 221 are referred to as the second setting options 222. The items of the first setting options 212 are the same as the items of the second setting options 222. Before step S450, the setting content of the second setting options 222 (that is, the setting parameters 230) may be the same as or different from the setting content of the first setting options 212. After step S450, the setting content of the second setting options 222 is the same as the setting content of the first setting options 212, as shown in FIG. 2 and FIG. 8.

In some embodiments of step S410, the first processing unit 111 not only obtains the setting parameters 230 of the first setting options 212, but also obtains program information (for example, a software name and/or version information) of the first application 210, and then generates the meta file 310 with the corresponding text content by using the obtained setting parameters 230 and the program information. In some embodiments, the first processing unit 111 of the first electronic device 110 may record the program information of the first application 210 to a header of the meta file 310 according to a tree structure of the meta file 310.

In some embodiments, during generation of the meta file 310, the first processing unit 111 may sequentially generate a tree structure of the corresponding setting parameters 230 according to locations, labels, and a setting order of the first setting options 212, and record the tree structure in the meta file 310.

Figure 5:
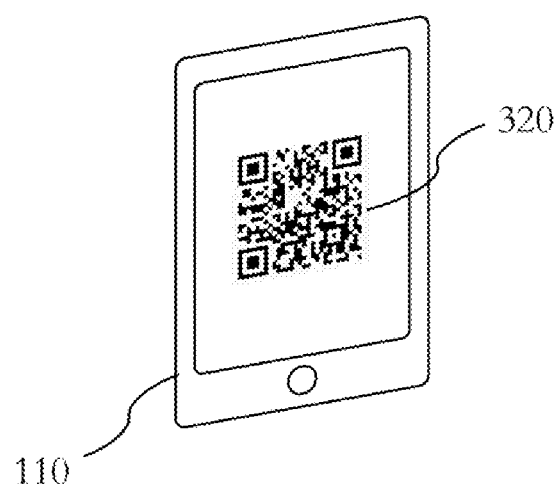
FIG. 5 is a schematic diagram of a set coding image according to an embodiment.
Figure 6:
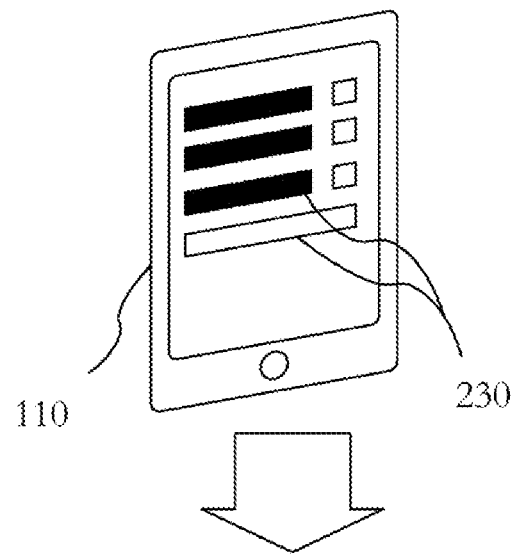
FIG. 6 is a schematic diagram showing that a first electronic device generates a set coding image according to an embodiment.
Figure 6:
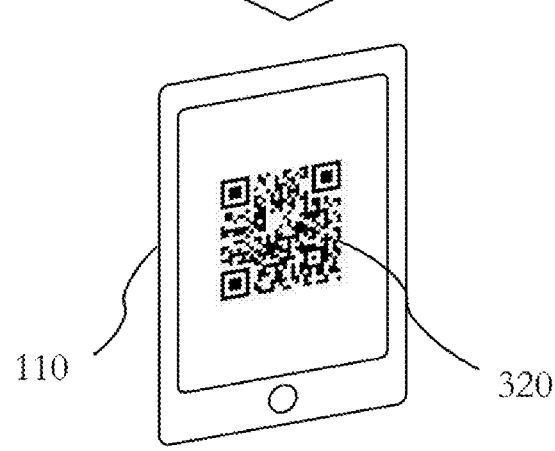

For example, the user selects the first application 210 through the user interface of the first electronic device 110 to cause the first processing unit 111 of the first electronic device 110 to run the first application 210. During the execution of the setting function of the first application 210, the first electronic device 110 provides and displays the first setting panel 211 with the plurality of first setting options 212 on the first display unit 113 (as shown in the upper diagram of FIG. 6) for the user to set the operating environment of the first application 210 through the user interface of the first electronic device 110. During the execution of the sharing function of the first application 210, the first processing unit 111 of the first electronic device 110 reads out program data representing the types and set values (that is, the setting parameters 230) of the first setting options 212 in the first setting panel 211, collects and records the program data in the XML file (that is, the meta file 310) with the text content of the tree structure corresponding to the setting parameters 230 (as shown in FIG. 6), and also records the program name (that is, program information) of the first application 210 in the header of the meta file 310. Then, the first processing unit 111 of the first electronic device 110 transforms the XML file into the QR code (that is, the set coding image 320) and displays the QR code on the screen (that is, the first display unit 113) (as shown in the lower diagram of FIG. 6). In FIG. 5 and FIG. 6, all of the first setting options 212 generate a single set coding image 320 by way of example, which is not limited in this way.

Figure 7:
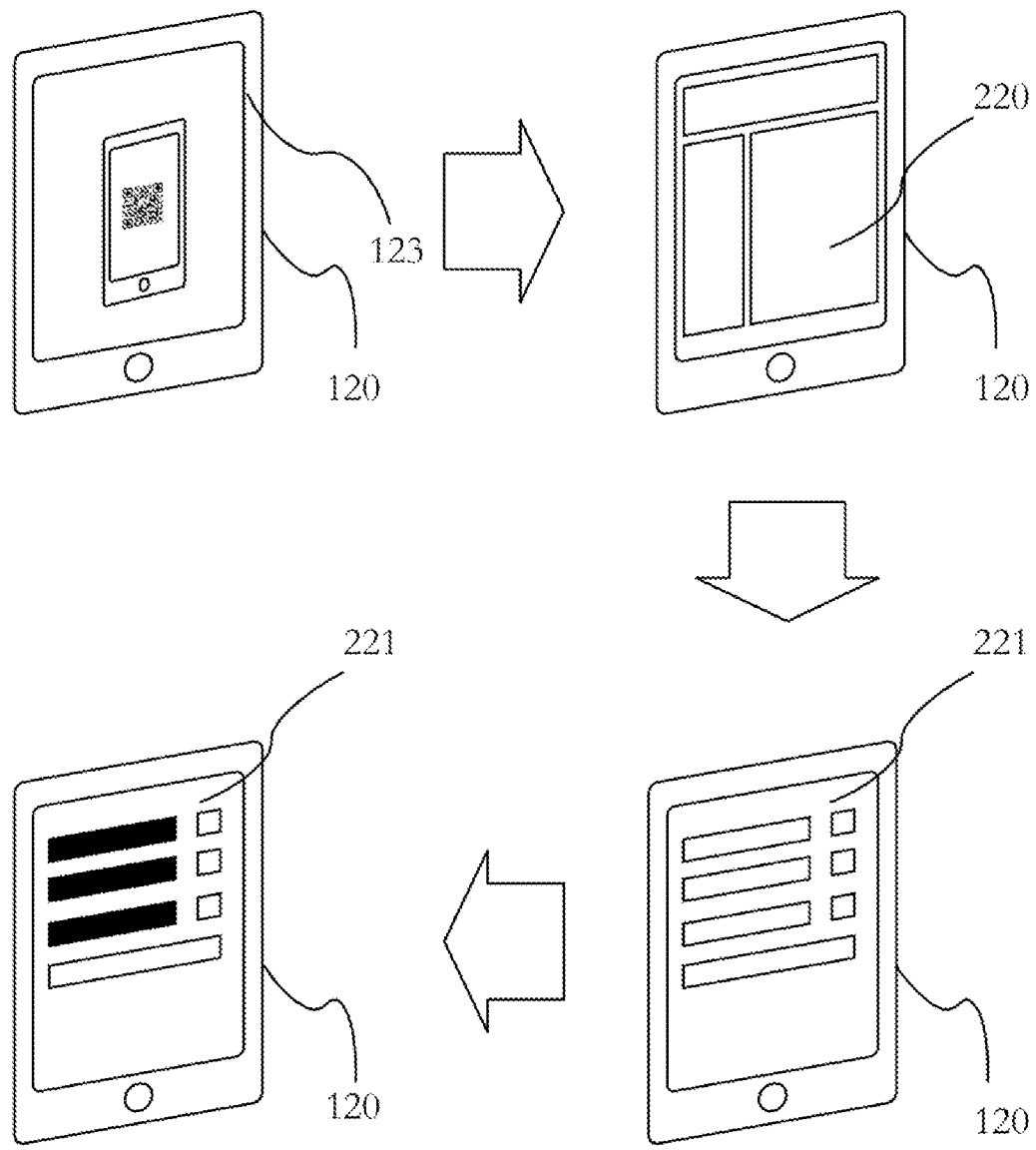
FIG. 7 is a schematic diagram showing that a second electronic device adjusts setting parameters by using the set coding image according to an embodiment.

During setting of the same application of the second electronic device 120, the user may capture a picture of the first electronic device 110 by using the photographing unit 124 of the second electronic device 120 (as shown in the upper left diagram of FIG. 7) to obtain the QR code, and then the second processing unit 121 decodes the QR code to obtain an XML file recording the text content of the tree structure corresponding to the setting parameters 230 and the header of the program name. Then, the second processing unit 121 selects the second application 220 according to the program name recorded in the header and executes the second application 220 (as shown in the upper right diagram of FIG. 7). After the second application 220 is executed, the second processing unit 121 transforms the text content of the tree structure corresponding to the setting parameters 230 into program data, and adjusts the setting parameters 230 of the second setting options 222 in the second setting panel 221 of the second application 220 (as shown in the bottom right diagram of FIG. 7) to be the same as the setting parameters 230 of the first setting options 212 with the program data (as shown in the bottom left diagram of FIG. 7). After the adjustment, the same setting options in the first setting panel 211 and the second setting panel 221 may be the same selected status or selected content.

In some embodiments, the first processing unit 111 may be implemented by one or more processors. The second processing unit 121 may also be implemented by one or more processors. Each of the processors may be, but is not limited to, a central processing unit (CPU), a System on Chip (SOC), a general-purpose or special-purpose microprocessor, a digital signal processor (DSP), a programmable controller, an application specific integrated circuit (ASIC), a programmable logic device (PLD), other similar processing devices, or a combination of the devices.

In some embodiments, the first storage unit 112 may be implemented by one or more storage elements. The second storage unit 122 may also be implemented by one or more storage elements. Each of the storage elements may be, but is not limited to, a memory, a memory card, or a register.

In some embodiments, the first display unit 113 may be, but is not limited to, a touch screen or a general display screen (that is, which has no touch function). The second display unit 123 may also be, but is not limited to, a touch screen or a general display screen (that is, which has no touch function). When the display unit (that is, the first display unit 113 and/or the second display unit 123) is a touch screen, the user interface may be the display unit, or may be an input device (a non-display unit) such as a keyboard, one or more buttons, a handwriting board, or any combination thereof that is additionally arranged.

In some embodiments, the photographing unit 124 may be implemented by a combination of a camera lens, a lens, and an image processor.

In some embodiments, the method for sharing a console variable setting of an application according to any embodiment may be realized by a computer program product. In other words, when an electronic device (that is, the first electronic device 110 and/or the second electronic device 120) loads and executes a program including a plurality of program codes, the method for sharing a console variable setting of an application in any embodiment can be performed. In some embodiments, the computer program product may be a readable recording medium, and the above program is stored in the readable recording medium for the electronic device to load. In some embodiments, the program itself may be a computer program product, and is transmitted to the electronic device in a wired or wireless manner.

Based on the above, according to the method for sharing a console variable setting of an application and the processing system 100 with a plurality of electronic devices provided in any of the embodiments, the setting content of an application installed in an electronic device (such as the first electronic device 110) can be conveniently acquired, and the same applications on other electronic devices (such as the second electronic device 120) are quickly set to the same setting parameters.

What is claimed is:

1. A method for sharing a console variable setting of an application, comprising: generating, by a first electronic device, a meta file, wherein the meta file comprises a set of setting parameters for a plurality of first setting options in a first application of the first electronic device; transforming, by the first electronic device, the meta file into a set coding image; and displaying, by the first electronic device, a display frame with the set coding image; capturing, by a second electronic device, the display frame to obtain the set coding image; transforming, by the second electronic device, the set coding image into the meta file; and adjusting the setting parameters, by the second electronic device, settings for a plurality of second setting options of a second application according to the meta file.

2. The method for sharing a console variable setting of an application according to claim 1, further comprising:

capturing, by a second electronic device, the display frame to obtain the set coding image;

transforming, by the second electronic device, the set coding image into the meta file; and adjusting the setting parameters, by the second electronic device, settings for a plurality of second setting options of a second application according to the meta file.

3. The method for sharing a console variable setting of an application according to claim 2, wherein the first setting options comprise a checkbox, a checklist, a group of options, a dropdown list, a toggle switch, a label, or a text field, and types and an order of the second setting options are the same as those of the first setting options.

4. The method for sharing a console variable setting of an application according to claim 2, wherein the meta file further comprises program information of the first application.

5. The method for sharing a console variable setting of an application according to claim 4, wherein the step of adjusting, by the second electronic device, the setting parameters for the second setting options of the second application according to the meta file comprises:

selecting and enabling, by the second electronic device, the second application the same as the first application according to the program information; and setting, by the second electronic device, the second setting options of the second application according to the set of setting parameters in the meta file.

6. The method for sharing a console variable setting of an application according to claim 1, wherein locations, labels, and a setting order of the first setting options of the first application are recorded in the meta file.

7. A system with a plurality of electronic devices, comprising:

a first electronic device, comprising a first processing unit, a first storage unit, and a first display unit, wherein the first processing unit is connected to the first storage unit and the first display unit, the first storage unit is configured to store a first application, and the first processing unit is configured to execute the first application, wherein during the execution of the first application, the first processing unit generates a meta file according to a plurality of first setting options of the first application, transform the meta file into a set coding image, and display a display frame with the set coding image on the first display unit; and a second electronic device, comprising a second processing unit, a second storage unit, and a photographing unit, wherein the second processing unit is connected to the second storage unit and the photographing unit, the second storage unit is configured to store a second application, and the second processing unit is configured to capture the display frame on the first display unit through the photographing unit to obtain the set coding image, decode the set coding image to obtain the meta file, and then execute the second application and set a plurality of second setting options of the second application according to the meta file.

8. The system with a plurality of electronic devices according to claim 7, wherein the meta file further comprises program information of the first application.

9. The system with a plurality of electronic devices according to claim 8, wherein the second electronic device is configured to select and execute the second application the same as the first application according to the program information, and then set the second setting options according to a set of setting parameters in the meta file.

10. The system with a plurality of electronic devices according to claim 7, wherein the first setting options comprise a checkbox, a checklist, a group of options, a dropdown list, a toggle switch, a label, or a text field, and types and an order of the second setting options are the same as those of the first setting options.

11. The system with a plurality of electronic devices according to claim 7, wherein the first processing unit records locations, labels, and a setting order of the first setting options of the first application in the meta file.

\* \* \* \* \*